United States Patent [19]

Garde

[11] Patent Number: 4,791,551

[45] Date of Patent: Dec. 13, 1988

[54] MICROPROGRAMMABLE DEVICES USING TRANSPARENT LATCH

[75] Inventor: Douglas Garde, Dover, Mass.

[73] Assignee: Analog Devices, Inc., Norwood, Mass.

[21] Appl. No.: 700,666

[22] Filed: Feb. 11, 1985

[51] Int. Cl.⁴ ............................................. G06F 9/22
[52] U.S. Cl. .................................................. 364/200
[58] Field of Search ... 364/200 MS File, 900 MS File

[56] References Cited

U.S. PATENT DOCUMENTS

| 4,027,292 | 5/1977 | Okamoto et al. | |
| 4,197,579 | 4/1980 | Otis, Jr. | 364/200 |
| 4,450,525 | 5/1984 | Demuth et al. | 364/200 |

FOREIGN PATENT DOCUMENTS

| 0087009 | 8/1983 | European Pat. Off. |
| 0124402 | 11/1984 | European Pat. Off. |

OTHER PUBLICATIONS

Microcomputer Interfacing, Artwick Bruce A., p. 147.
Computer System Architecture, Mano M. Morris, p. 22-23.
Digital Logic and Computer Design, Mano M. Morris, p. 258.
Lab Manual for ECE554 at the University of Wilson–Madison, Chapter II; Microprogrammed Design, FIG. 10, 12e, 12g AMD Databook, 1980–1981, pp. 2-147, FIG. D.
Electronics International, vol. 51, No. 23, 11-9-78, New York (US) Thomas M. Hedges, "Replacing Hardwired Logic with Microcode", for pages see International Search Report.
IBM Technical Disclosure Bulletin, vol. 22, No. 10, 3/80, NY (US), P. E. Anderson et al, "Two Speed Control Storage", pp. 4690-4691.

Primary Examiner—Gareth D. Shaw
Assistant Examiner—Debra A. Chun
Attorney, Agent, or Firm—Wolf, Greenfield & Sacks

[57] ABSTRACT

In a microprogammed controller, the conventional pipeline register is replaced by a pair of coupled latches: a so-called "transparent" latch is placed between the output of the microprogram memory and the input of one or more system resources including at least the sequencer or address generator, and another latch is placed between the output of each such resource and the destination of its output. The appropriate bits of a microinstruction are supplied from the microinstruction memory to the associated resource via the transparent latch. The clock signal for the sequencer or other resource serves as the enable signal for the output latch (which can be either a transparent latch or an edge-triggered latch resposive to the rising edge of the clock signal), while the inverted sense of the clock signal provides the enable signal for the transparent latch. This allows data to propagate through the resource to internal destinations therein even before the results of the previous instruction are cleared from the resource's output latch. Set-up conditions for an instruction thus can occur within a resource while the results of the previious instruction are still sitting in the resource's output latch. Therefore those set-up conditions can already have been completed (or at least partially completed) before the results of the prior instruction are cleared out of the output latch and the new microinstruction is latched into the input latch.

18 Claims, 5 Drawing Sheets

MICROPROGRAMMABLE DEVICES USING TRANSPARENT LATCH

FIELD OF THE INVENTION

This invention relates to the field of digital information or signal processing systems and, specifically, the processing or control units thereof. More particularly, the invention relates to the use of transparent latches in place of pipeline registers in programmed (especially microprogrammed) control paths within the control units of such information or signal processing systems.

BACKGROUND OF THE INVENTION

Microprogramming is a technique which has been in existence for more than thirty years as a method for designing and utilizing the control unit in a digital computer or other digital controller. (Hereinafter the term "digital computer" will be used by itself but should be understood to refer to and include other digitally controlled devices, as well.) In a digital computer, the control unit may also be referred to as the processor or central processing unit. The control unit is that portion of the system which directs all hardware activity within the system. For example, the control unit causes instructions to be fetched from memory, decodes the instructions to determine the operation to be performed, determines the source and destination of data, causes movement of data and the required operation to be performed, and then repeats the entire process until a halt operation is executed. In hard-wired, or conventional control, the logic of the control unit is physically wired in when the machine is built, using large arrays of gates, flip-flops and other devices. Such a hard-wired design is intended to be able to execute a fixed repertoire of "machine (or machine-level)" instructions in a predetermined manner.

Though the execution of a machine instruction requires interregister movement of data, the machine instruction does not care whether that data movement occurs alone or concurrently with other activity. It is therefore possible to define a lower level set of instructions, called microinstructions, which allow greater control over inter-register transfers of data. The execution of a machine-level instruction is obtained by executing an associated sequence of microinstructions; that sequence is frequently termed a microprogram.

A microprogram for each available machine-level instruction may be stored in a control memory, which is also called a control store, microprogram memory or microcode memory. To execute a specific machine instruction, the corresponding microprogram is executed. When the system is designed such that the user is permitted to write its own microprograms, the memory used for storing user-generated microprograms is often called a writable control store or alterable control memory. Microprogramming by the user allows him or her to develop new machine-level instructions (augmenting the manufacturer-supplied instruction set) and is often employed to allow one computer to accept software written using an instruction set intended for another computer. This is referred to as emulation.

Often, the microprogram memory in microprogrammable machines is divided into two parts: (1) read-only memory (ROM) which contains the microcode for executing the basic instruction set of the machine as specified by the manufacturer and (2) random-access memory (RAM) for the writable control store. Some microprogrammable microprocessors, referred to as bit-slice microprocessors, do not come with any predefined machine-level instruction set, leaving all higher level instructions to be developed from user-generated microinstructions.

A microprogrammable control mechanism of a computer system operates on a program sequencer and a variety of other objects, such as arithmetic and logic units, registers and control flip-flops. These various devices are referred to generically as "resources." For purposes of this discussion, the sequencer may be thought of as a resource even though it usually would be treated separately. Each microinstruction contains one or more bits to control each of the resources and control lines in the microprogrammed system, to effect the required operations and inter-register transfers. Thus the bits of a microinstruction may include data as well as commands. Microinstructions are therefore often quite large and may encompass fifty, sixty or more bits. When the bits in a microinstruction are applied to all the resources and the resources are clocked, one microinstruction is executed.

Machine instructions are performed by executing a microprogram—i.e., several microinstructions in a predetermined sequence. The address of such successive microinstruction is generated by the program sequencer. The sequencer, using the condition signals and instructions provided to it during each microinstruction, determines the next microcode address whose contents will be read. The microcode address is provided by the sequencer to the control memory, and a short time later (the memory's access time), the corresponding microinstruction appears at the outputs of the microprogram memory. Each microinstruction appears at the output of the microprogram memory at a predetermined edge of a clock signal.

In many systems and applications, speed of execution of microinstructions is of great concern. While numerous factors affect microinstruction execution time, one of the most important factors is microprogram memory access time, since microprogram memory access frequently consumes a substantial portion of the instruction cycle. To reduce such access time, faster microprogram memory may be used if the fastest microprogram memory is not already in use, but at the expense of additional cost: the cost of microprogram memory varies inversely with access time. That is, the faster the memory the more it will cost. Other improvements may be obtained by employing architectures which allow some operations to occur concurrently with other operations, rather than sequentially.

When a microprogram is being run, however, the constituent microinstructions must be executed in an intended, predetermined sequence until the completion of the entire microprogram, since the microprogram operates as a way of implementing a corresponding machine instruction. This limits the possibilities for concurrency. It is further important to allow sufficient time for each microinstruction to be executed before proceeding to the next microinstruction. These operating conditions are generally insured by not allowing the next microinstruction to be supplied to the system resources until the then current microinstruction has been completely executed. The separation between present instruction and next instruction is accomplished by placing a so-called "pipeline" register, or latch, on the output of the microprogram memory. The output state of the pipeline register is the present microinstruction even while its input terminals may be receiving the next microinstruction. As noted above, the output of the pipeline register is allowed to change to the next microinstruction only after the present microinstruction has been completely executed.

In some prior art systems, such as those that use the mode Am2900 microprocessor (slice) family from Advanced Micro Devices of Sunnyvale, Calif., a pipeline register on the output of the microprogram memory essentially splits the system into two parts: the data manipulation control bits go out to the system resources while a portion of the microinstruction is returned to the sequencer to determine the address of the next microinstruction to be executed. That address is sent to the microprogram memory and, after the memory access time elapses, the next microinstruction sits at the input of the pipeline register. Thus, while the resources are executing one instruction, the next instruction is being fetched from the microprogram memory. The presence of the pipeline register allows the microinstruction fetch to occur concurrently with at least part of the data operation, rather than serially.

However, on at least some of the system resources, the execution of a microinstruction is not an atomic operation; it itself involves an internal sequence of steps or events. Some of these events are preliminary operations which "set up" conditions required before other steps can occur; these "set-up" steps may, for example, be trivial operations such as waiting for data or signals to propagate to destination points. That is, time may be required for the values of operands at data inputs of the resource to propagate to appropriate locations within the resource, or to cause certain actions to occur within the resource before the instruction can be executed. Thus, the resource cannot perform its ultimate operations until the set-up conditions have been satisfied. The prior art systems therefore do not even begin to execute one microinstruction until the previous microinstruction has been fully executed.

The prior art systems suffer at least one other inefficiency, as well. Regardless of the speed of the various resources, the pipeline register supplies the new instruction's bits to all of the resources at the same time. Thus, the faster resources may remain idle (and nonproductive) while the slower resources complete the instruction cycle. Moreover, the speed required of the microprogram memory is dictated (for a given instruction cycle time) by the slowest resource. The expense of a memory of given speed is required even though for most resources that speed is not needed or utilized.

Accordingly, it is an object of the present invention to provide a system wherein execution of a microinstruction may begin earlier than was previously possible.

Another object of the present invention is to provide a microprogrammed controller which reduces the delay caused by preliminary, set-up operations which must occur in resources before microinstruction execution, and to thereby decrease the duration of an instruction cycle.

A further object of this invention is to decrease instruction cycle time without requiring the use of a faster, more expensive microprogram memory.

Another object of the present invention is to permit the use of slower, and therefore less expensive, microprogram memory while not increasing, and possibly decreasing, instruction cycle time.

Yet another object of the invention is to permit the segmentation of the microprogram memory so that the speed of each segment can be matched to the speed of the appropriate resource.

SUMMARY OF THE INVENTION

In accordance with this invention, the foregoing objects are achieved by employing in cooperation with a microprogram sequencer (and if desired, other system resources, as well) a novel microinstruction latch mechanism, which takes the place of a conventional pipeline register. This latch mechanism allows the sequencer or other resource to begin its set-up operations for each new instruction before the previous instruction cycle has been completed. This "advance look" at the next instruction allows that next instruction to be executed more rapidly upon the conclusion of the preceeding microinstruction cycle.

For purposes of explanation, the invention will be discussed in the context of its application to a sequencer, though it may be used with other resources or microprogrammed devices, as well.

To achieve the indicated operation, the conventional pipeline register discussed above is replaced by a pair of coupled latches: a so-called "transparent" latch is placed between the output of the microprogram memory and the input of the sequencer, and another latch is placed between the output of the sequencer and the destination of its output. The appropriate bits of a microinstruction are supplied to the sequencer via the transparent latch. The transparent latch is a two state device whose state is selected by a control, or "enable", signal which is supplied to an "enable" input of the latch. In a first (i.e., "enabled" or "transparent") state, the output signals of the latch follow the signals applied to the latch's respective data inputs, after a propagation delay; in the second (i.e., "disabled" or "latching") state, the outputs of the transparent latch hold the values of the signals at the latch's respective data inputs as of the time the latch is disabled. The "enable" input of the transparent latch is level-sensitive; that is, the latch is in the transparent state when the signal applied to its enable input is low and is in the latched state when that enable signal goes high.

The clock signal for the sequencer also serves as the enable signal for the output latch if the latter is a transparent latch, or as the clock signal for the output latch if it is a latch of the edge-triggered type, while the inverted sense of the clock signal serves as the enable signal for the transparent latch.

The microcode address output from the sequencer is taken via the sequencer's output latch. Thus, as soon as the next microcode address (or other results of the execution of a particular microinstruction) are available from the output latch, the transparent input latch exposes the sequencer to the instruction and data for the next cycle. This allows data to propagate through the sequencer to internal destinations even before the instruction is clocked into the sequencer; set-up conditions for the next instruction can occur while the current instruction address is still sitting in the sequencer's output latch. Thus those set-up conditions can already have been completed (or at least partially completed) before the current address is updated in the output latch and the new microinstruction is latched into the input latch.

The invention is pointed out with particularity in the appended claims. The above and further objects, features and advantages of the invention may be better understood by referring to the following detailed description, which should be read in conjunction with the accompanying drawing.

DETAILED DESCRIPTION OF AN ILLUSTRATIVE EMBODIMENT

Figure 1:
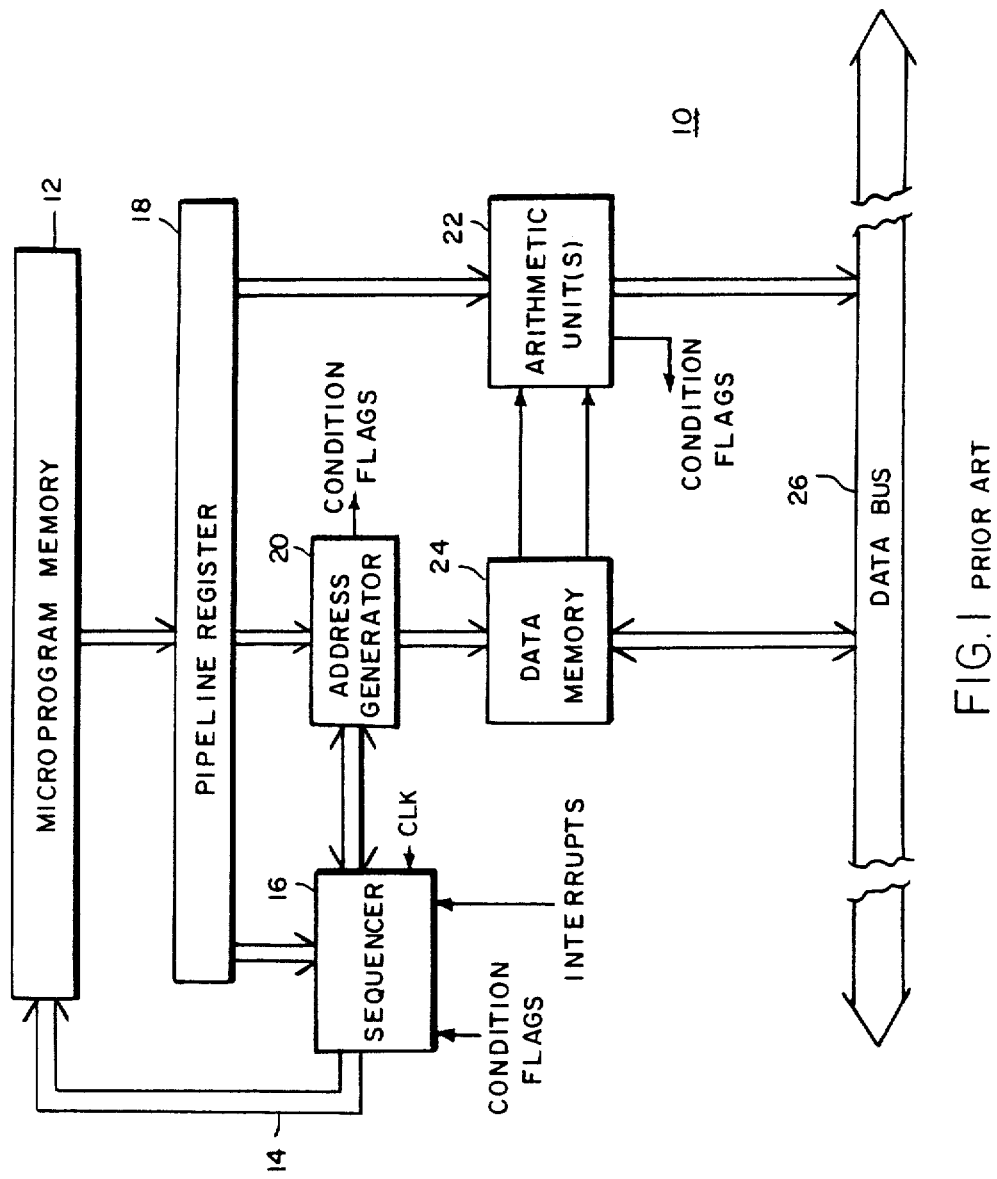
FIG. 1 is a block diagram of a microprogrammed system according to the prior art.

An exemplary prior art microprogrammed processor system 10 is shown in FIG. 1. There, a microprogram memory (also called a control store or control memory) 12 contains microinstructions to be executed. The output of the microprogram memory 12 contains in predesigned bits the contents of a location specified by the address supplied on lines 14 from microinstruction sequencer 16. The program sequencer controls the flow of instructions. It determines which addresses are read from the microprogram memory, which in turn governs the operation of all the systems' elements. The sequencer determines successive addresses to be read from the microcode memory on the basis of the instructions, condition signals and interrupts supplied to it. Instructions provided to the sequencer may include conditional instructions such as various kinds of jumps, subroutine branches and returns. Each address generated by the sequencer can be either the current address incremented by one, an absolute or relative address provided by an external source, one of a number of maskable and prioritized interrupt vectors, a jump address from the internal random access memory or an address taken from the top of a stack.

Each microinstruction from memory 12 is isolated from the sequencer and other resources by pipeline register 18 until such time as the instruction cycle begins; the instruction then is supplied to the outputs of the pipeline register. The various bit-fields of the microinstruction are read by the sequencer 16 and by the other resources of the system, such as address generator 20 and arithmetic unit 22. Each resource then operates to generate the appropriate output.

Address generator 20, for example, selects addresses in data memory 24 containing data and coefficients to be used or operated upon by arithmetic unit 22 or the addresses of data or coefficients to be placed on or taken from data bus 26.

The speed of operation of such a microprogrammed controller may be characterized by two parameters: the clock-to-address time of the microprogram memory and the minimum cycle time for a microinstruction. Together these parameters determine how fast each of the system resources must operate.

The use of a pipeline register in a sense separates successive pairs of instruction cycles, allowing an instruction to be executing while the next instruction is already being fetched. The pipeline register is typically a clocked latch. The existing instruction is held in the pipeline register while the next instruction is being fetched; the next instruction is, in effect, held in isolation and is not supplied to the sequencer (or other resource) until the previous instruction cycle is over. Consequently, the execution of the current instruction is unaffected by the concurrent fetching of the next instruction.

Figure 2:
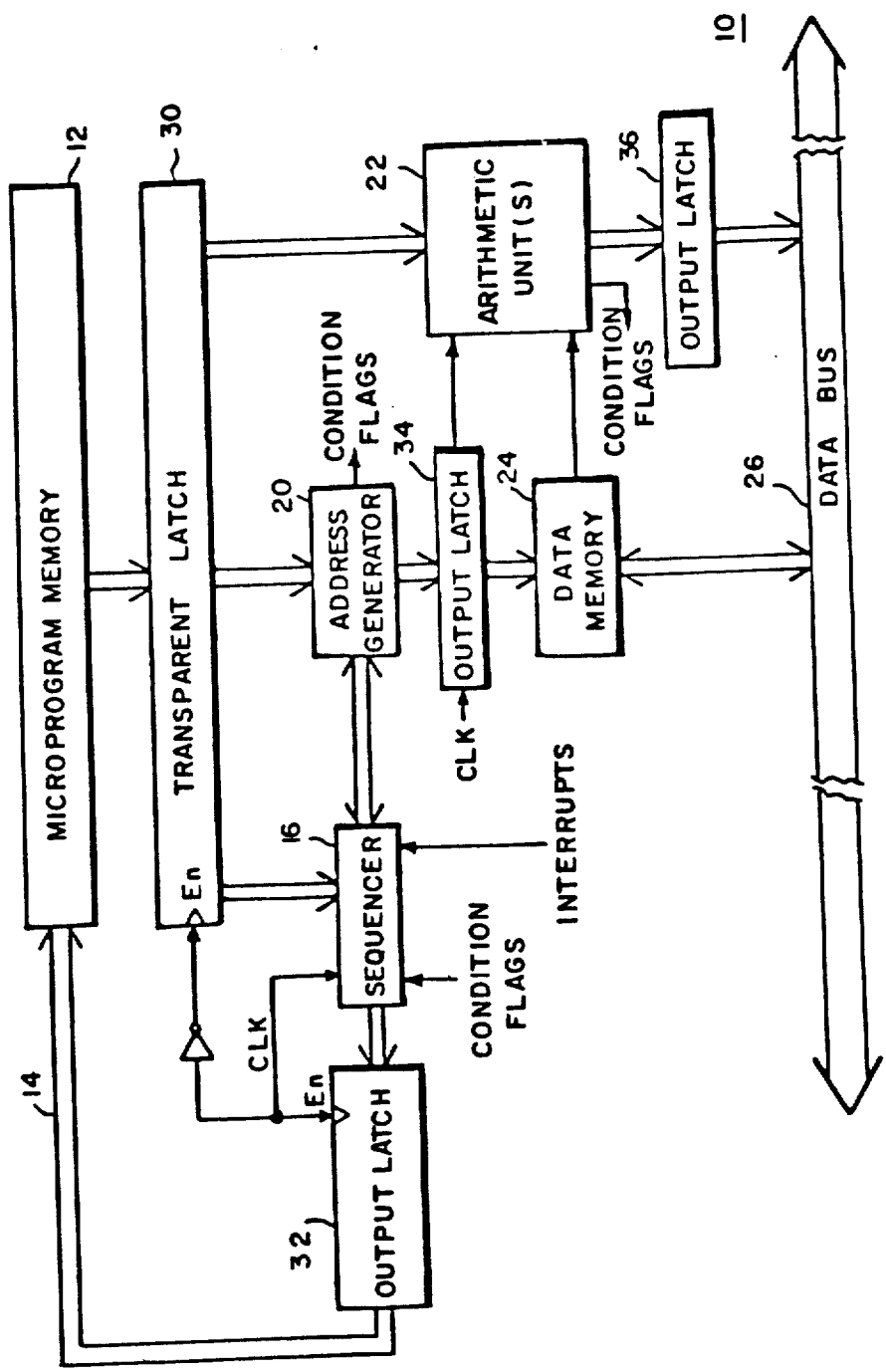
FIG. 2 is a block diagram of a microprogram system according to the present invention.

A comparable block diagram for a system incorporating the present invention is shown in FIG. 2. There, the pipeline register has been replaced by a transparent latch 30 in combination with output latches 32, 34 and 36. A clock signal (CLK) is supplied as necessary to sequencer 16 and resources 20 and 22, as well as to the "enable" terminals of the output latches. The inverted state of the CLK signal, CLK*, is supplied to the enable terminal of the transparent latch 30. One cycle of the CLK signal defines the instruction cycle.

While the clock signal (CLK) is low, the transparent latch 30 is enabled and is, therefore, in its transparent state; thus, data and instructions are fed through from the input terminals of the latch (i.e., from the microprogram memory) to its output terminals, from which they are provided to the devices which receive the various bits of the microinstruction. The output latches 32, 34 and 36 will be disabled or, latched, when the clock is low, so they will hold the results of the previous instruction cycle during that interval.

When the CLK signal goes high, the input latch 30 is disabled, (i.e., latched), and it holds the microinstruction; the output latches 32, 34, and 36 are enabled, allowing the results of the previous instruction cycle to be fed into the output latches.

Thus, instruction decoding occurs during the set-up time while the clock signal is low and the input latch is enabled, while the output and states are latched during the set-up time or are clocked at the rising edge clock transition from low to high.

The resources do not do anything irretrievable in response to their new inputs until the outputs from the previous instruction have been captured in the respective output latches. In other words, the output is released at the same time as the new input is latched.

The state latches (not shown), in fact, do not feed new state information until the prior results are latched.

Figure 3:
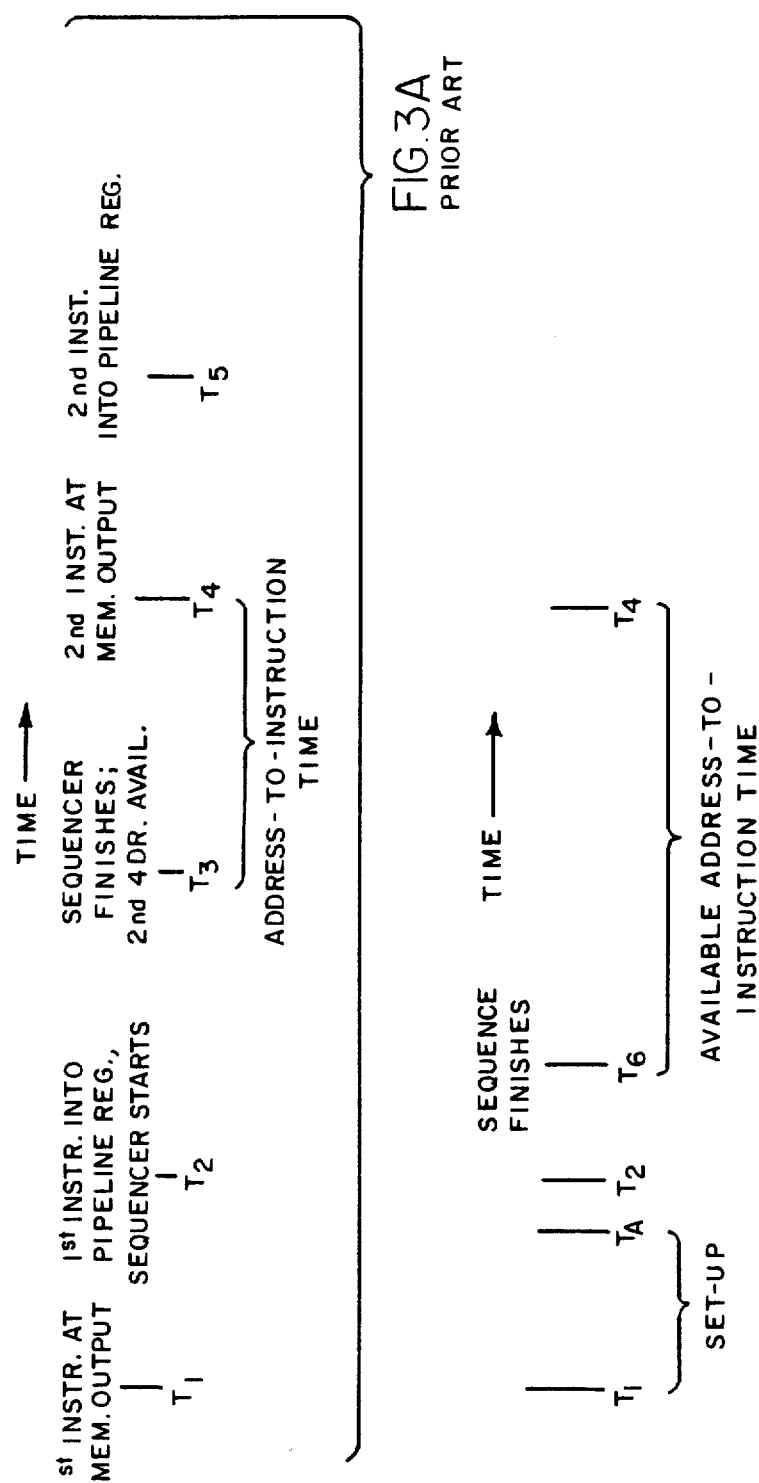
FIG. 3A is a timing diagram illustrating a pipelined microprogram sequencer according to the prior art.
FIG. 3B is a timing diagram illustrating the operation of the sequencer according to the present invention.

The operating sequence and timing provided by the present invention is compared with the prior art in the timing diagrams of FIGS. 3A and 3B. In FIG. 3A, the prior art is shown. There, a first microinstruction appears at the output of the microprogram memory 12 at an instant $T_1$. Some time later, at time $T_2$, the instruction is latched into the pipeline register 18 and the sequencer 16 starts to determine the next microcode address. The sequencer finishes at instant $T_3$, the new address is supplied to microprogram memory 12 and the next microinstruction appears at the memory's output at some later time, $T_4$. This new instruction is clocked into the pipeline register at $T_5$, replacing the old contents. Thus an instruction cycle encompasses the interval $T_2$–$T_5$; and the interval between $T_3$ and $T_4$ is the memory's address-to-instruction time. By contrast, the operation of the present invention is illustrated in FIG. 3B.

There, we begin by assuming that the first instruction appears at the output of microprogram memory 12 at the same instant, $T_1$, as in the prior example. At that moment, the input latch 30 is in its transparent state, so the first instruction is exposed to the inputs of the sequencer beginning at $T_1$; the sequencer thus begins to perform set-up operations, making internal fetches and allowing data (which term is used here to include, without limitation, information which might also be referred to as "instructions") to propagate to internal destinations. When the clock signal changes state at instant $T_2$, the state of the input latch changes to "latched" and the sequencer completes the calculation of the next address. Since the sequencer had already started its operation, it completes the calculation at some time $T_6$ which is earlier than $T_3$ (the time it finished in FIG. 3A).

With this invention, there is a reduction in time from the instant the bits of a microinstruction are latched to the inputs of the sequencer to the time the next microcode address appears at its output. If a fixed clock cycle is being used, this reduction in sequencer response time provides additional time for the microcode memory to provide its output instruction once addressed. Thus, for a selected clock rate, slower (and therefore less expensive) microcode memory can be used. Conversely, for the same speed memory, the clock cycle can be reduced, resulting in a faster instruction cycle and the ability to perform a greater number of operations per unit time. Typically, if a clock cycle of about 70 ns is used, the present invention may shorten the time from instruction to output address at the sequencer by about 20 ns. Thus, either the instruction cycle can be shortened by 20 ns or the microcode memory address-to-output latency speed can be increased by 20 ns. This is quite significant inasmuch as in such systems, the cost of the microcode memory may exceed the cost of the other components by a considerable amount. Thus, the ability to reduce the cost of the microcode memory by using a slower memory can have a significant effect on reducing the cost of the overall system. For example, if the microcode memory consists of 64,000 words and is, for example, 64 bits wide—that is, each microinstruction is 64 bits long, the cost of 30 ns memory could be thousands of dollars. By contrast, if a 50 ns memory is used, the cost might be reduced by 30 or 40 percent.

Similarly, if the address generator is, by use of the present invention, enabled to provide an address more quickly, there is more time for the data memory to operate and a slower and therefore less expensive data memory may be used, as well. Often, there will be more data memory provided than microcode memory, so the cost savings for the use of slower memory can be even greater than the cost savings for the use of a slower microcode memory.

The latch arrangement of the present invention is most useful in connection with devices which perform sequential operations during the course of an instruction cycle, since it allows a headstart in performing some of those operations.

Figure 4:
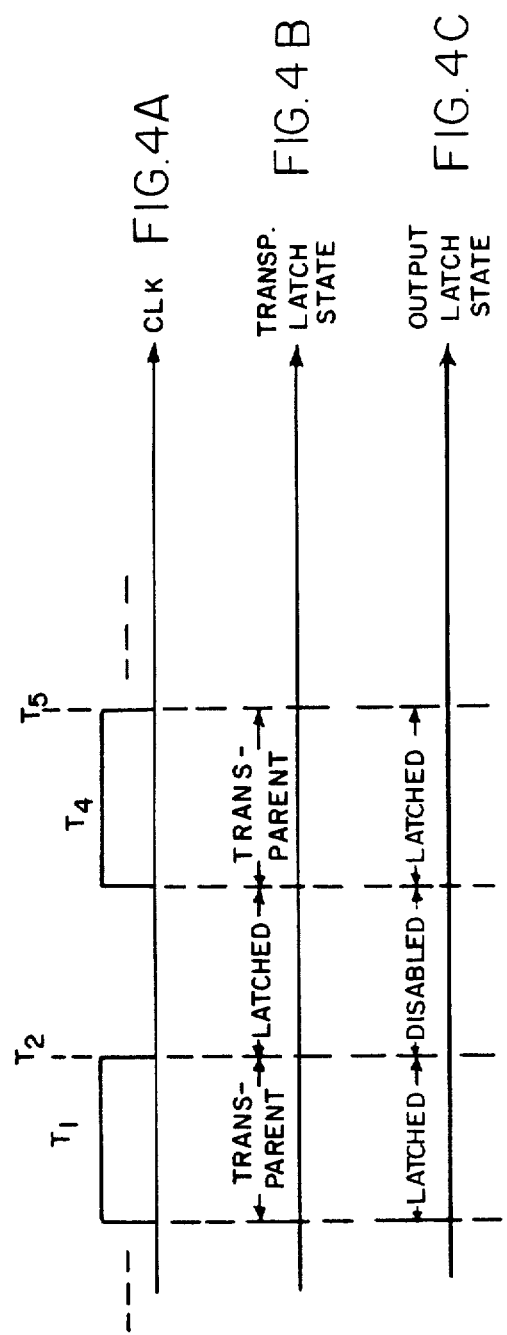
FIGS. 4A–4B are timing diagrams illustrating, respectively, the clock-signal and the respective states of the input and output latches in relation to the clock signal.

The relationship between the clock signal and the states of the latches is illustrated in FIGS. 4A-4C. The clock signal (CLK) is shown in FIG. 4A, for reference. The state of the input latch 30 is shown in FIG. 4B, while the state of the output latch 32 (for example) is illustrated in FIG. 4C.

Figure 5:
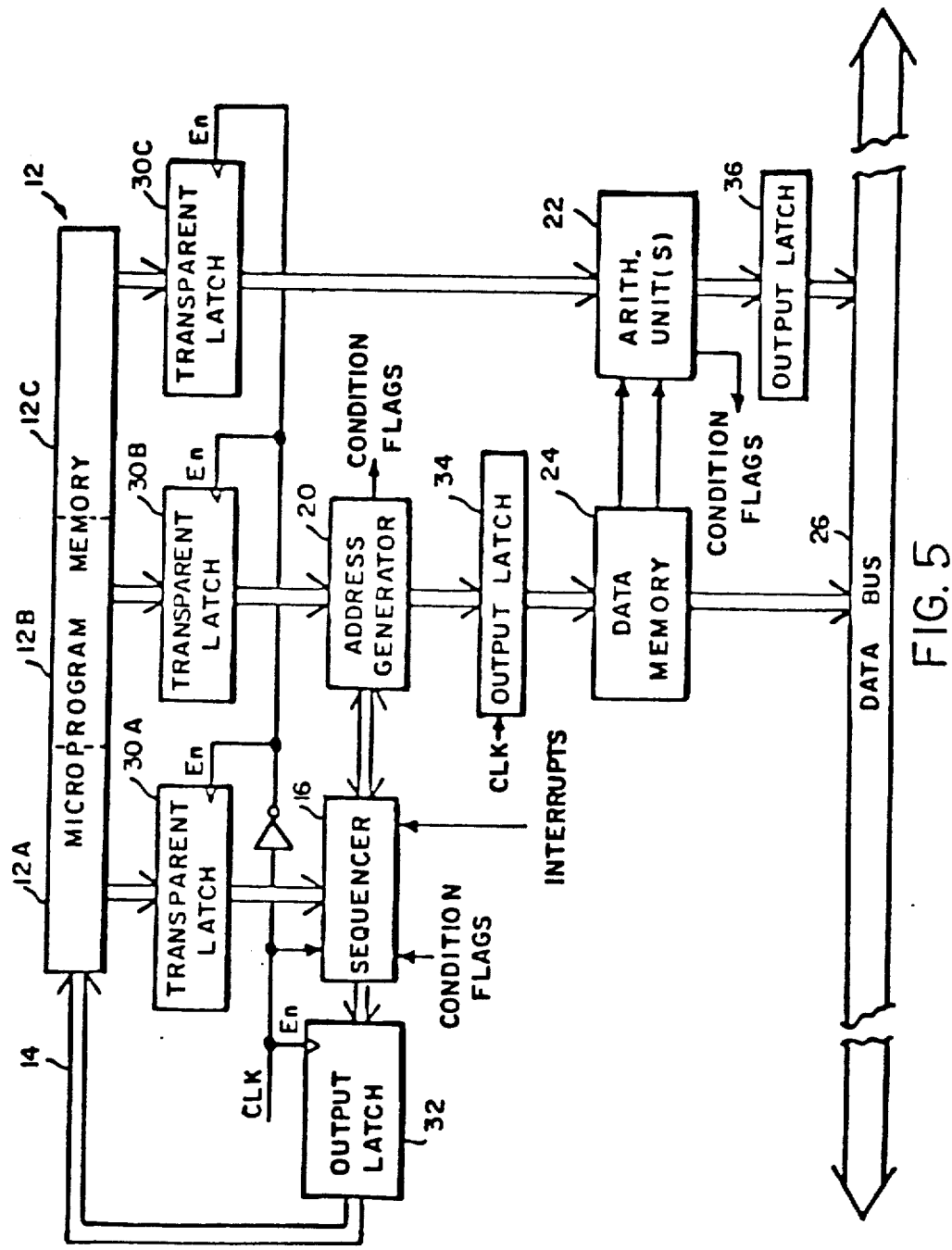
FIG. 5 is a block diagram is a block diagram of an alternative embodiment of the present invention wherein the microcode memory has been subdivided into multiple memories or memory segments.

Another variation of the present invention is shown in FIG. 5, wherein as illustrated the microcode memory 12 has been subdivided, or fragmented, into multiple memory elements (or memory segments), three such microcode memory elements 12A, 12B and 12C being shown for purposes of example. Memory elements 12A-12C are addressed in common but may have different address-to-output times so that slower memory can be used where the reduction in speed can be tolerated. This allows, for example, some trade-off between the speed of microcode memory segments and the speed of the resources such as the data memory. Each system resource is associated with a transparent latch (30A-30C) for interfacing with the associated memory element.

An added benefit of the present invention is that the sequencer can respond to condition signals (also called condition flags) more rapidly. A condition signal is one which indicates whether a designated event has occurred, such as a register overflow. Condition signals are generated by various devices and it is often a critical limiting factor to be able to generate a condition signal and get it into the sequencer to be used at the appropriate time without requiring an extra pipeline delay. In the present invention, the sequencer can be looking at the condition input and data/instruction during the set-up interlude, so that it can act upon them with a minimum amount of delay.

Further, since a pipleine register essentially contains twice as many transistors per bit of storage as does a transparent latch, the use of a pair of transparent latches in place of a pipeline register (one at the input of a resource and the other at its output) imposes virtually no additional delay. This technique is therefore well suited to implementation in integrated circuits.

Having thus described exemplary embodiments of the invention, it will be apparent that various alterations, modifications and improvements will readily occur to those skilled in the art. Such obvious alterations, modifications and improvements, though not expressly described above, are nonetheless intended to be implied and are within the spirit and scope of the invention. For example, although FIG. 2 shows the transparent latch substituting completely for the pipeline register in buffering the output of the microprogram memory, it should be understood that some of the advantages of the invention are obtained with variant configurations. Thus, a pipeline register may be used to buffer the input to some of the system resources so long as a transparent latch is used as the input buffer for at least the sequencer or the address generator (in combination with an output latch, of course). A pipeline register may even be used at the output of the sequencer with a transparent latch at the input of the address generator; the address generator will thus get to "look" at the appropriate microinstruction bit field during the low portion of the clock cycle, a time when, by contrast, if a pipeline register had been used at the input of the address generator, that resource would have been isolated from that new information. Moreover, although the invention has been explained in the context of a microprogrammed system, that environment was only used for purposes of illustration. Other types of instructions and combinations of types of instructions can be executed using this invention. For example, higher level instructions may be fetched in response to addresses provided by the sequencer, with microinstructions being provided only to selected resources, such as arithmetic units.

Accordingly, the foregoing discussion is intended to be illustrative only, and not limiting; the invention is limited and defined only by the following claims and equivalents thereof.

What is claimed is:

1. Apparatus for use in a programmed control unit for receiving and processing instructions from an instruction memory, comprising, in combination:
   a. a transparent latch having a plurality of data input terminals, an output terminal associated with each data input terminal, and a latch enable input terminal for receiving an enable signal to control the state of the transparent latch, the transparent latch being in its transparent state when the enable signal is provided in a predefined, enabling state and said latch being in a latched state when the enable signal is provided in a predefined, latching state;
   b. a system resource having input terminals and output terminals;
   c. the data input terminals of the transparent latch being connected to receive from the instruction memory selected output bits from each instruction supplied at the output of the instruction memory and the output terminals of the transparent latch being connected to selected input terminals of the system resource;
   d. an output latch having a plurality of data input terminals and an output terminal associated with each data input terminal;
   e. the outputs of the system resource being connected to the data input terminals of the output latch; and
   f. a device for receiving information from the system resource, such device having a set of input terminals and each such input terminal being operatively connected to an output terminal of the output latch.

2. The apparatus of claim 1 wherein the output latch associated with a system resource is adapted to receive a clock signal for controlling the state of the latch, and the transparent latch associated with that resource is adapted to receive at the enable input terminal thereof the inverted state of such clock signal, the inverted clock signal comprising the enable signal for the transparent latch.

3. In an information processing system for executing microinstructions, said system including a microinstruction memory, a system resource having input terminals and output terminals, means for providing to the microinstruction memory successive addresses of microinstructions to be fetched, and the microinstruction memory providing at its outputs microinstructions in response to addresses supplied to its address inputs, the improvement comprising:
   a. transparent latch having a plurality of data input terminals, an output terminal associated with each data input terminal, and a latch enable input terminal for receiving an enable signal to control the state of the transparent latch, the transparent latch being in its transparent state when the enable signal is provided in a predefined, enabling state and said latch being in a latched state when the enable signal is provided in a predefined, latching state;
   b. the data input terminals of the transparent latch being connected to receive from the microinstruction memory selected output bits from each microinstruction supplied at the output of the microinstruction memory and the output terminals of the transparent latch being connected to selected input terminals of the system resource;
   c. an output latch having a plurality of data input terminals and an output terminal associated with each data input terminal;
   d. the outputs of the system resource being connected to the data input terminals of the output latch; and
   e. a device for receiving information from the system resource, such device having a set of input terminals and each such input terminal being operatively connected to an output terminal of the output latch.

4. The system of claim 3 wherein a clock signal is supplied to the output latch associated with a system resource and the inverted state of the clock signal is supplied to the enable input of the transparent latch associated with that resource, as the enable signal therefor.

5. The system of claim 3 wherein the means for providing to the microinstruction memory successive addresses of microinstructions to be fetched is a sequencer, and further including:
   f. a second transparent latch the data input terminals of which are connected to receive from the microinstruction memory selected output bits from each microinstruction supplied at the output of the microinstruction memory, and the output terminals of which are connected to the data inputs of the sequencer.

6. The system of claim 5, further including:
   g. a second output latch having a plurality of data input terminals and an output terminal associated with each data input terminal; and
   h. the outputs of the sequencer being connected to the data input terminals of the second output latch; and
   i. the output terminals of the second output latch being operatively connected to respective ones of the address input terminals of the microinstruction memory.

7. A digital information processing system for executing digital instructions, any two successive instructions being termed first and second instructions, respectively, the system comprising:
   a. an instruction memory for storing instructions in addressable locations and for supplying instructions from such locations in reponse to address signal applied thereto;
   b. a program sequencer including clocked elements responsive to a clocking signal provided thereto, and having input terminals and output terminals;
   c. the output terminals of the sequencer operatively connected to the instruction memory to provide thereto address signals for indicating the next instruction to be fetched therefrom; and
   d. means for providing to input terminals of the sequencer a predetermined bit field of each instruction supplied by the instruction memory, such means providing to the sequencer said bit field of the second instruction before the address signals generated by the sequencer responsive to the first instruction have been provided to the instruction memory.

8. The system of claim 7 wherein the means for providing said predetermined bit field to input terminals of the sequencer comprise:
   1. a transparent latch connected to receive from the instruction memory selected bits from each instruction supplied at the output of the instruction memory, such transparent latch having a transparent state and a latching state, the state of such latch being selected by the state of an enable signal supplied to an enable input terminal thereof;

2. the inverted state of the clocking signal being supplied to said enable input as said enable signal; and
3. the output terminals of the transparent latch connected to respective ones of the input terminals of the sequencer.

9. The system of claim 8 wherein the instructions are microinstructions.

10. The system of claim 8 further including:
   e. an output latch having respective ones of its input terminals connected to respective output terminals of the sequencer; and
   f. the output terminals of the output latch connected to respective ones of the address input terminals of the instruction memory.

11. The system of claim 10 wherein the instructions are microinstructions.

12. In a digital information processing system for executing microinstructions and having a microinstruction memory, a microprogram sequencer and at least one system resource for receiving and acting upon various bit fields of the microinstructions, the improvement comprising:
   a. a transparent latch connected to receive from the microinstruction memory selected bits from each microinstruction supplied at the output of the microinstruction memory;
   b. the output terminals of the transparent latch connected to respective ones of the microinstruction input terminals of the sequencer;
   c. an output latch having respective ones of its input terminals connected to respective output terminals of the sequencer; and
   d. the output terminals of the output latch connected to respective ones of the address input terminals of the microinstruction memory.

13. In an information processing system for executing microinstructions, said system including a microinstruction memory, a sequencer for providing to the microinstruction memory successive addresses of microinstructions to be fetched, and the microinstruction memory providing at its outputs microinstructions in response to addresses applied to its address inputs, the improvement comprising:
   a. a transparent latch having a plurality of inputs and an output associated with each input;
   b. the inputs of the transparent latch connected to receive from the microinstruction memory selected output bits from each microinstruction supplied at the output of the microinstruction memory and the outputs of the transparent latch connected to the inputs of the sequencer;
   c. an output latch having a plurality of inputs and an output associated with each input;
   d. the outputs of the sequencer connected to the inputs of the output latch; and
   e. the outputs of the output latch connected to the address inputs of the microinstruction memory.

14. The system of claim 13 wherein a clock signal is supplied to the sequencer and the inverted state of the clock signal is supplied to the enable input of the transparent latch.

15. In an information processing system for executing microinstructions, said system including a microinstruction memory, a sequencer for providing to the microinstruction memory successive addresses of microinstructions to be fetched, and the microinstruction memory providing at its output microinstructions in repsonse to addresses supplied to its address inputs, the improvement comprising;
   a. the microinstruction memory being divided into a plurality of memory segments, each memory segment providing predetermined bits of each microinstruction and further operating with an address-to-output response time independent of the address-to-output time of other memory segments;
   b. for each memory segment, a transparent latch having a plurality of inputs and an output associated with each input;
   c. the inputs of a first transparent latch connected to receive from a first segment of the microinstruction memory selected output bits from each microinstruction supplied at the output of the microinstruction memory, and the outputs of such first transparent latch being connected to the inputs of the sequencer;
   d. the inputs of each other transparent latch being connected to receive from another segment of the microinstruction memory other selected outputs of each such other transparent latch being connected to the inputs of one of the system resources;
   e. for the sequencer and for each system resource, an associated output latch having a plurality of inputs and an output associated with each input;
   f. the outputs of the sequencer and other system resources connected to the inputs of the associated output latch;
   g. the outputs of the output latch associated with the sequencer connected to the address inputs of the microinstruction memory; and
   h. at least one device for receiving information from the other system resources, such at least one device having a set of input terminals and each such input terminal being operatively connected to an output terminal of the associated output latch.

16. In an information processing system for executing microinstructions, said system including a microinstruction memory, an address generator, a data memory addressable by the address generator, means for providing to the microinstruction memory successive addresses of microinstructions to be fetched, and the microinstruction memory providing at its outputs microinstructions in response to addresses supplied to its address inputs, the improvement comprising:
   a. a transparent latch having a plurality of inputs and an output associated with each input;
   b. the inputs of the transparent latch connected to receive from the microinstruction memory selected output bits from each microinstruction supplied at the output of the microinstruction memory and the outputs of the transparent latch connected to selected inputs of the address generator;
   c. an output latch having a plurality of inputs and an output associated with each input;
   d. the address outputs of the address generator connected to the inputsof the output latch; and
   e. the outputs of the output latch connected to the address inputs of the data memory.

17. The system of claim 16 wherein a clock signal is supplied to the address generator and the inverted state of the clock signal is suppied to the enable input of the transparent latch.

18. A method of operating an instruction sequencer used to generate successive addresses of instructions to be fetched from an instruction memory in an information processing system controlled by a clocking signal which alternates between first and second states, comprising, for each instruction the steps of:
 a. while the clocking signal is in the first state, supplying to the sequencer a set of information to be used to generate the address of the next instruction to be fetched from the instruction memory; and
 b. supplying the clocking signal to the sequencer and responsive to a change in the state of the clocking signal from the first state to the second state, the sequencer computing the address of the next instruction using said set of information.

* * * * *